J. C. SLOCUM.
TOOL ADJUSTING MECHANISM.
APPLICATION FILED APR. 7, 1911.

1,049,616.

Patented Jan. 7, 1913.

UNITED STATES PATENT OFFICE.

JOHN C. SLOCUM, OF CHICAGO, ILLINOIS, ASSIGNOR TO THE COMMERCIAL BANK AND SAVINGS COMPANY, OF BOWLING GREEN, OHIO, A CORPORATION OF OHIO.

TOOL-ADJUSTING MECHANISM.

1,049,616.    Specification of Letters Patent.    Patented Jan. 7, 1913.

Application filed April 7, 1911. Serial No. 619,503.

*To all whom it may concern:*

Be it known that I, JOHN C. SLOCUM, a citizen of the United States, residing at Chicago, Cook county, Illinois, have invented new and useful Tool-Adjusting Mechanism, of which the following is a specification.

This invention relates to a device for varying the position of a working member.

This invention has utility for adjusting the position of a rotary tool, which adjustments or even throwing into or out of working position may be effected during the rotation of the tool.

Figure 1:
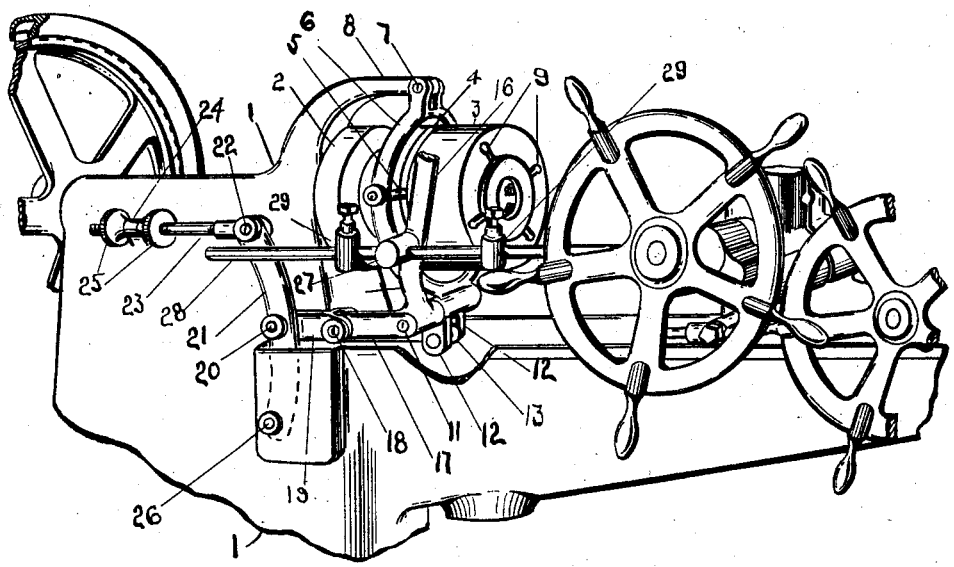
Figure 2:
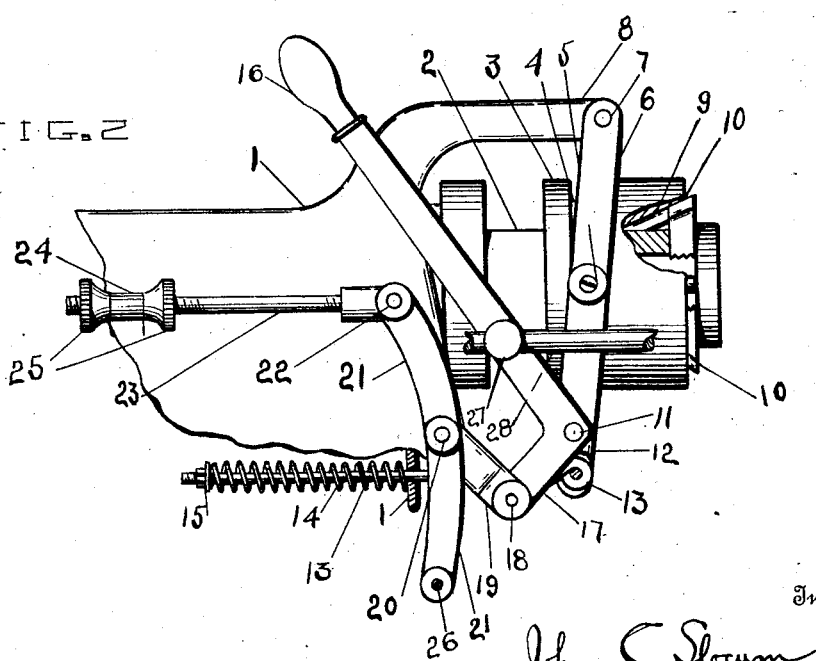

Referring to the drawings: Figure 1 is a perspective view with parts broken away showing an embodiment of the invention in a thread cutting tool which may be designed for cutting screw or bolt threads, the adjusting device having the tool in working position; and Fig. 2 is a fragmentary elevation on an enlarged scale with parts broken away showing adjusting device in withdrawn position for the tool.

The framework 1 of the machine tool carries the rotary shaft or head 2 upon which is mounted for reciprocation the die or chuck ring 3 fixed against relative rotation as to the driving shaft 2. This ring 3 has therein a groove 4 engaged by pins 5 carried by the yoke 6 mounted on the fixed pivot 7 carried by the bracket arm 8 from the frame 1. The ring 3 has taper grooves 9 therein to receive the tool or working die elements 10 shown as thread cutters herein. The inclination of the grooves 9 toward the center tends to control the inward extension of the thread cutting dies 10 so that these dies or tool elements are controlled as to their working position through the ring 3 as reciprocated by the yoke 6. Engaging a lower portion of the yoke 6 which is remote from the pivot pin mounting 7 of said yoke is the pivot pin 11 below which the yoke has a pair of extension ears 12 between which is mounted the eye rod 13 extending back through the frame 1 where it is surrounded by the coil spring 14 abutting at one end with the frame 1 and with the other adjustably held by the nut 15 on the bolt 13 so that this spring is normally effective to draw the yoke 6 back or out of working position.

Mounted upon the pin 11 of the yoke 6 is the angle lever having the handle 16 and the toggle link extension 17 connected by pivot pin 18 with the link 19 so that these links 17, 19, form a toggle between the pin 11 of the yoke 6 and the pin 20 of the adjusting lever 21 which has one end connected by pin 22 to threaded adjusting rod 23 extending through bracket 24 to the frame 1. This adjusting rod 23 is adjusted by means of the pair of nuts 25 abutting the opposite sides of the bracket 24, one of which nuts 25 may serve as adjusting means and the other as a lock nut for varying the position of the rod 23 to effect adjustment of the lever 21, which lever has as its fixed fulcrum the pin 26 mounted in the frame 1.

Carried by the handle portion 16 of the angle lever, 16, 17, is the boss 27 through which extends the rod 28 connected to the device for feeding the material to be acted upon. Adjustably mounted upon this rod 28 are stop members 29 which in the normal operation of the machine may come into contact with the lug 27 and thus automatically bring about a throw of the tool into or out of working position.

In operation, say with a machine as shown in position in Fig. 1, a force tending to tilt the handle 16 toward the frame 1, which force may be at the grip portion of the handle when manually controlled or by action of the lug 29 away from the frame 1 as to the lug 27 moving toward the frame 1 trips the toggle. Such slight movement of the lever 16 as throws the toggle pin 18 out of dead center line between the pins 11, 20, at once releases the yoke 6 so that the spring 14 may at once withdraw the tool from the work. To re-set manually, of course the handle 16 is grasped and thrown away from the frame 1, while for automatic setting the lock 29 nearer the frame 1 in its travel away from said frame 1 will contact said lug 27 and automatically throw the handle 16 into such position as will bring the toggle links 17, 19, into dead center position against the resistance of spring 14. Due to the wearing of the working element or of refinements in adjustments desired without interfering with the normal operation of the machine as to rotation of shafts 2, it is found desirable to effect adjustment of these cutting dies 10, and this may be readily, conveniently and accurately accomplished with a great degree of fineness by the adjusting nuts 25 connected to rod 23 to vary the position of the lever 21. This refinement may be to any degree desired because there is not only opportunity for fine threading of the rod 23, but there may be such relative distribution of this adjustment relatively to the arms of the lever 21 upon the opposite sides of the pin 20 as will contribute to further accuracy in close measurements for this adjustment of the position of pin 20 controls the throw-in or working position of the dies 10 as controlled by the ring 3. The convenience of this adjustment makes it of most considerable value in practice.

What is claimed and it is desired to secure by Letters Patent is:

1. The combination with a rotary holder, a tool carried thereby, and a tool adjusting member, of a yoke engaging the member, a lever provided with a grip portion, said lever directly connected to the yoke to throw the tool into and out of working position, and means connected to the lever independently of the yoke for varying the position of the range of movement of the lever.

2. The combination with a rotary holder, a tool carried thereby, and a tool adjusting member reciprocable along the holder, of a yoke having a pivot mounting, said yoke engaging the member, a throw lever pivotally connected directly to the yoke remote from the pivot mounting of the yoke, and means for shifting the position of the range of movement of the lever to vary the throw of the yoke, said lever having an actuating extension beyond its pivotal connection to the yoke.

3. The combination with a frame, a rotary holder, a tool carried by the holder, and a tool adjusting member, of a fixedly pivoted yoke mounted on the frame and engaging the member, a lever intermediate its length directly pivoted to the yoke for adjusting the working position of the member, and an adjustable link mounted upon the frame and connected to the lever.

4. The combination with a frame, a rotary holder, a tool carried by the holder, and a tool adjusting member, of a fixedly pivoted yoke mounted in the frame and engaging the member, and adjusting means for varying the working position of the tool, said means including an angle throw lever directly pivoted at its angle on the yoke, a movable bearing for an arm thereof, and a mounting for said bearing including a connection to the frame.

5. The combination with a frame, a rotary holder, a tool carried by the holder, and a tool adjusting member, of a fixedly pivoted yoke mounted on the frame and engaging the member, and adjusting means for varying the working position of the tool, said means including a hand lever directly connected to the yoke and having an arm forming a toggle link, and a second toggle link connected to said arm and adjustably connected to the frame.

6. The combination with a frame, a rotary holder, a tool carried by the holder, and a tool adjusting member, of a fixedly pivoted yoke mounted on the frame and engaging the member, and adjusting means for varying the working position of the tool, said means including a lever provided with an arm, said lever directly pivoted to the yoke, and a shiftable link connected to the arm to vary the position of the range of lever movement.

7. The combination with a frame, a rotary holder, a tool carried by the holder, and a tool adjusting member, of a yoke mounted on the frame and engaging the member, and adjusting means for varying the working position of the tool, said means including a pair of floating links between the frame and yoke, an arm for throwing one of the links, and an adjusting device provided with a connection to the frame for varying the position of the other link as to the frame by adjustment of said device.

8. The combination with a rotary holder, a tool carried thereby, and a tool adjusting member, of a yoke engaging the member, and adjusting means for the yoke to vary the working position of the tool, said means including an angle lever connected to the yoke, a link engaging the lever, and an adjustable lever for mounting the link.

9. The combination with a rotary holder, a tool carried thereby, and a tool adjusting member, of adjusting means for the tool comprising a plurality of links terminating in a lever having a fixed pivot and an adjustable pivot.

In testimony whereof I affix my signature in the presence of two witnesses.

JOHN C. SLOCUM.

Witnesses:
 EVERETT S. WISE,
 EDNA M. LA RASH.

---

Copies of this patent may be obtained for five cents each, by addressing the "Commissioner of Patents, Washington, D. C."